CONTROL FOR SEISMOGRAPH PROSPECTING FILTER CIRCUITS

Filed Nov. 14, 1955

INVENTOR.
Thomas Bardeen.
BY [signature]
ATTORNEY

United States Patent Office 2,911,600

Patented Nov. 3, 1959

2,911,600

CONTROL FOR SEISMOGRAPH PROSPECTING FILTER CIRCUITS

Thomas Bardeen, Fox Chapel, Pa., assignor to Gulf Research & Development Company, Pittsburgh, Pa., a corporation of Delaware Application November 14, 1955, Serial No. 546,708

13 Claims. (Cl. 333—70)

This invention relates to seismograph prospecting filter circuits, and in particular concerns a band-pass filter circuit for multi-channel seismograph prospecting apparatus which is easily adjusted by a single control to any desired midfrequency and which has an independent single control for the filter band width.

The use of electrical filters in seismograph prospecting apparatus is well known. These filters usually comprise band-pass units. It has been found desirable to change the midfrequency of the band-pass filter as a function of time because the shallow reflections which arrive early in the recording are generally of higher frequency than the deep reflections which arrive later on in the recording.

In order to obtain optimum signal-to-noise ratio in seismograph prospecting apparatus it is also common to provide adjustment of the filter band width. It is generally desirable to operate with as broad a band as the background noise level will permit because a wide band permits more faithful recording of reflection character.

Certain aspects of this invention are disclosed and claimed in copending applications Serial Nos. 546,706, filed November 14, 1955, now Patent No. 2,867,779, granted January 6, 1959, and 546,707, filed November 14, 1955, which are assigned to the same assignee as the present application.

Because of the large number (up to 24 or more) of seismograph channels now commonly used in seismic prospecting apparatus it has become desirable to provide a single control for the frequency adjustment of all channels. This may be done by employing a filter having saturable-core inductances and simultaneously varying the current through the control windings of all channels. If the band width is to be maintained, considerably additional switching is required. This invention provides a filter circuit and method of adjustment in which the midfrequency may be adjusted as desired, and in which the band width may be independently adjusted as desired without affecting the midfrequency adjustment. By employing this invention it becomes possible to adjust all seismograph channels as to midfrequency and as to band width by means of but two simple controls.

It is accordingly an object of this invention to provide means for independently adjusting the mid-frequency and the band width of a filter circuit.

It is a further object of this invention to provide means for simultaneously adjusting the midfrequency of a plurality of seismograph filter circuits and for simultaneously adjusting the band width of the plurality of filter circuits, said means providing for said adjustments to be made independently of each other.

These and other useful objects of this invention are accomplished as described in this specification, of which the drawings form a part, and in which—

Figure 1:
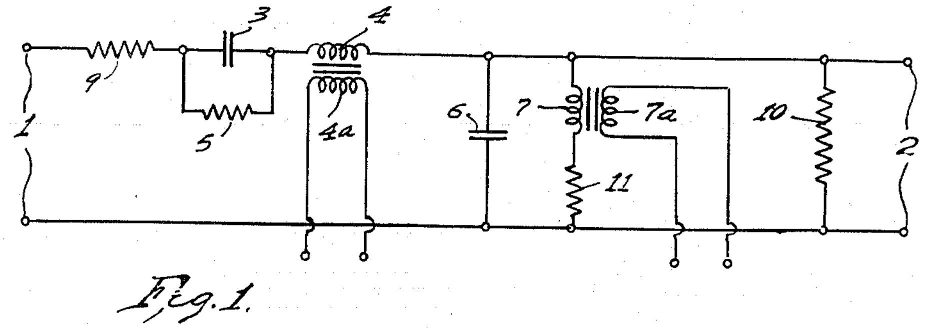
Figure 2:
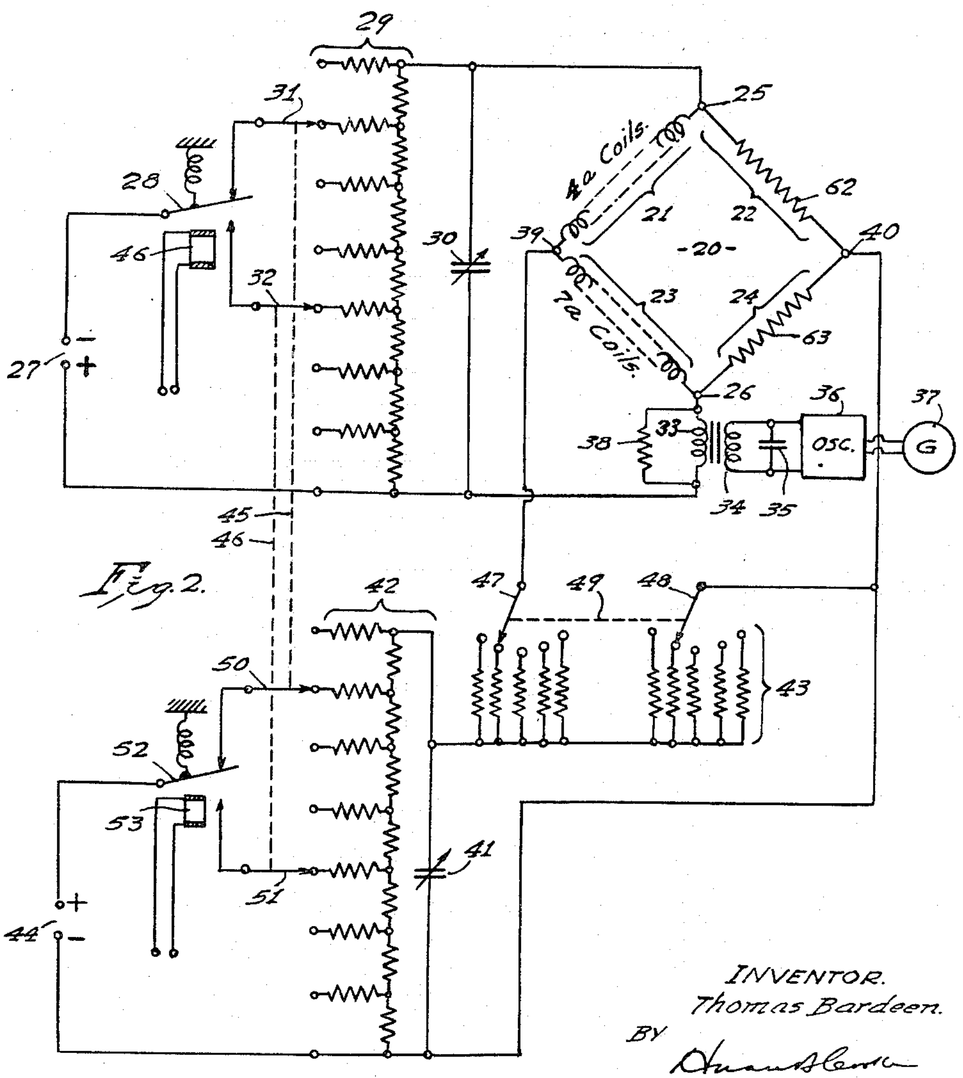

Figure 1 shows a schematic wiring diagram of the type of filter circuit employed in this invention; and Figure 2 shows a schematic wiring diagram of the control system of this invention whereby the midfrequency and band width of the circuit of Figure 1 may be independently adjusted.

This invention preferably employs a band-pass type of filter having a series-tuned condenser and inductance and a parallel-tuned condenser and inductance, the inductances being of the saturable-core type so that their respective inductances may be varied by varying the current through a core-flux control winding. In this invention the series-tuned-inductance-control coils of all channels are connected in one arm of a balanced Wheatstone bridge circuit and the parallel-tuned-inductance-control coils of all channels are connected in an adjacent arm of the same bridge, midfrequency-control current being passed between one pair of diagonally-opposed corners of the bridge, and band-width-control current being passed between the other pair of diagonally-opposed corners of the bridge.

Figure 1 shows a schematic wiring diagram of the preferred type of band-pass filter circuit employed. The input is at terminals 1 and the output at terminals 2. The series-tuned circuit comprises condenser 3 and saturable-core reactor 4, the latter having a control winding *4a*. The parallel-tuned circuit comprises condenser 6 and saturable-core reactor 7, the latter having a control winding *7a*. Increase in current through the control winding decreases the respective inductance. The commonly employed input termination of the filter is represented by resistor 9 and the commonly employed output termination by resistor 10. Resistor 5 connected across the series-tuned condenser, and resistor 11 connected in series with the parallel-tuned inductance serve to maintain the shape of the transmission characteristic with various frequency adjustments as is disclosed and claimed in copending application Serial No. 546,706.

The inductances 4 and 7 of Figure 1 are saturable-core reactors and the respective cores of these inductances are provided with control windings *4a* and *7a* respectively. By passing D.C. current through the coils *4a* and *7a* it is possible to vary the flux density in the core of the respective inductance and in this manner control the incremental permeability of the core at the operating point. Inasmuch as the incremental permeability decreases with an increase in flux density, it is thus, possible to control the inductances 4 and 7.

In order to vary the midfrequency adjustment of the filter of Figure 1, D.-C. currents are passed through coils *4a* and *7a* in such manner so as to maintain the tuning of the series-tuned elements to the same frequency as that of the parallel-tuned elements. Under this condition the resulting filter characteristic has minimun band width. For purposes of this invention band width is defined as $(f_1-f_2)$ where $f_1$ is the frequency of half amplitude on the high cut-off side of the filter characteristic and $f_2$ is the frequency of half amplitude on the low cut-off side of the filter characteristic. In order to widen the band-pass characteristic the two tuned circuits comprising elements 3 and 4 and elements 6 and 7 respectively are each detuned in opposite directions from the midfrequency $f_0$. For purposes of this invention the midfrequency is defined by $f_0=(f_1+f_2)/2$. In order to widen the band and still maintain the midfrequency, the series-tuned inductance 4 must be decreased and the parallel-tuned inductance must be increased. This may be done by increasing the current through coil *4a* and decreasing the current through coil *7a*.

In order to prevent transfer of energy from the coil 4 to its control coil and from coil 7 to its control coil, each respective inductance 4 and 7 is actually formed of a pair of inductances connected in series opposition with respect to a common control coil, i.e. a so-called hum-bucking connection is employed.

Commercially available saturable-core reactors are employed which have a similar variation in the tuning of the respective circuits as the respective control currents are varied. It has been found that a linear relationship between tuning frequency and control current is obtained with commercially-available saturable-core reactors having high permeability core material and that this relationship holds over a range of 4 to 1 in frequency.

By way of example and without limiting the invention, values of components which have been used are as follows:

| Component: | Value |
| --- | --- |
| Resistor **9** | 12.3 kilo-ohms. |
| Resistor **5** | 300 kilo-ohms. |
| Condenser **3** | .0612 mfd. |
| Condenser **6** | .33 mfd. |
| Resistor **11** | 680 ohms. |
| Resistor **10** | 62 kilo-ohms. |
| Inductance **4** | Adjustable. (Pair of saturable-core reactors with hum-bucking coils, total D.-C. resistance 3000 ohms, high-permeability core material, .003" thick ribbon wound into a toroid). |
| Inductance **7** | Adjustable. (Pair of saturable-core reactors with hum-bucking coils, total D.-C. resistance 1600 ohms, high-permeability core material .003" thick ribbon wound into a toroid). |

The control coils 4(*a*) and 7(*a*) of the above-listed inductances 4 and 7 have substantially the same D.-C. resistances but in any case the control coil may have external series and/or parallel resistance added so that the same change in frequency results from the same change in current of each control unit. When reference is made to the control coil or its current, such added resistors are intended to be included in the unit.

When using the above-listed components, the relationship between tuned frequency ($f$) of either the series-tuned or parallel-tuned circuit has been found to be given by the linear equation $f=A+Bi$ where A and B are constants and $i$ is the control current through the respective control coil 4*a* or 7*a*. This equation has been found to hold for the above-listed components over the range 20 to 80 cycles per second.

Because of the linear relationship between tuning and control current it follows that for either circuit $\Delta f \alpha \Delta i$, where $\Delta f$ is the change in frequency (detuning) for a small change in control current $\Delta i$. It is apparent from these relationships that the midfrequency adjustment depends on $i$ and the band width depends on $\Delta i$.

The circuit by means of which the midfrequency and the band width are independently varied is shown in Figure 2. The principal feature of Figure 2 lies in a balanced Wheatstone bridge circuit 20 comprising four arms 21, 22, 23 and 24. The series-tuned-inductance-control coils 4*a* for the amplifier channels are connected in series in the arm 21. The parallel-tuned-inductance-control coils 7*a* of the amplifier channels are connected in series in adjacent arm 23. The arms 22 and 24 comprise resistors 62 and 63 whose resistances are in the same ratio as the resistances of arms 21 and 23, so that the bridge is balanced. Alternatively half of the series-tuned-inductance-control coils may be connected in the arm 21 and the other half of the series-tuned-inductance-control coils connected in the opposite arm 24 and in the same way, half of the parallel-tuned-inductance-control coils may be connected in the arm 22 and the other half of the parallel-tuned-inductance-control coils connected in the arm 23. In this event it is preferable to have equal resistances in all the bridge arms. If required some additional resistance (not shown) may be added to the appropriate bridge arms either in series or parallel to effect a balanced condition.

Current for controlling the midfrequency of the filter pass band is applied across the diagonal points 25 and 26 of the bridge 20. For this purpose a source of control voltage such as a battery (not shown) is connected to the terminals 27 in accordance with the polarity indicated and passes through a single-pole double-throw relay armature 28 to a resistance network indicated generally by 29, and to a condenser 30 whose purpose will be described later. The network 29 may have two switches 31 and 32 whose purpose will also be described later.

Consider the bridge 20 first with no external circuit connected to points 39 and 40. Current from the source 27 (as modified by the condenser 30) flows through the bridge 20 from point 26 to point 25 and in the absence of any other external influence divides between arms 21 and 22. If no current enters or leaves point 39, the current in coils 4*a* will be the same as the currents in coils 7*a*. If the current is changed, for example, by changing the adjustment of resistance network 29, the current changes equally in the 4*a* coils and in the 7*a* coils. In this manner the current flowing through the bridge maintains tuning of the series-tuned circuit, as well as tuning of the parallel-tuned circuit, and therefore the current passing between points 26 and 25 determines the midfrequency adjustment of the filter.

In accordance with an invention disclosed and claimed in copending application Serial No. 546,707 the external bridge current passing from points 26 and 25 also passes through the control coil 33 of a saturable-core inductance 34, which together with condenser 35, forms the tank circuit of an oscillator 36. Output from oscillator 36 is connected to a galvanometer 37 which records on the same record as the various seismic channels of which the filters of Figure 1 form a part. The inductance 34 with its control coil 33 is arranged so that the oscillator frequency is adjusted to the same mid-frequency as that to which the bridge current adjusts the filter. This condition may easily be met by using the same type of saturable-core reactor 34 in the oscillator circuit as is used in the filter circuit, and any necessary adjustment to bring the oscillator to frequency coincidence with the filter adjustment may be made by adjusting the resistor 38. The record trace of galvanometer 37 thus provides the operator with a record of the filter frequency adjustment at all times. The operator may, by adjusting the resistance network 29, adjust the filter frequency to any desired value as determined by comparing the recorded deflection frequency with the frequency of the trace recorded by galvanometer 37.

The foregoing description assumes that there is no current flow from the point 39 to the point 40 of the bridge. Inasmuch as the bridge is balanced, it will cause no current flow in a circuit connecting points 39 and 40. Likewise, because the bridge is balanced, if an external current is passed between points 39 and 40 this current will not affect the external current flow between points 25 and 26. However, by applying an external voltage between points 39 and 40, the current flow in adjacent arms of the bridge may be altered. Assume for example that current is flowing from point 26 through the bridge to point 25. If a smaller current is passed from point 39 to point 40, the current in arm 21 will increase whereas the current in arm 23 will decrease. Similarly the current in arm 24 will increase and the current in arm 22 will decrease. Furthermore since the bridge resistances are balanced, passage of external current between points 39 and 40 will not change the external current which passes between points 26 and 25. Accordingly, any current passed from 39 to 40 will not affect the current in control coil 33 of the monitoring oscillator 36, nor will it affect the midfrequency adjustment of the filter. Furthermore, the external smaller current passed from 39 to 40 will increase the current in the *4a* coils of the filters (arm 21) and decrease the current through the *7a* coils of the filter (arm 23) by exactly the same amount. This results in detuning the two resonant circuits of the filter so as to broaden the band width by an amount determined by the external current between points 39 and 40, but without changing the midfrequency which is determined solely by the external current passing from points 26 and 25. Accordingly, it is seen that the mid-frequency may be adjusted by changing the external current flow from points 26 to 25, and the band width may be independently adjusted by changing the external current flow from points 39 to 40.

Points 39 and 40 of the bridge 20 are connected through a constant-impedance network 43 to a condenser 41 (whose purpose will be described later) and a resistance network indicated generally by 42 controlled by switches 50 and 51. The band-width control circuit is supplied with D.-C. as from a source (not shown) connected to terminals 44 in accordance with the polarity indicated. The two adjustable resistance networks 42 and 43 thus each function independently to adjust the band width, and furthermore adjustment of either the network 42 or 43 will adjust the band width $(f_1-f_2)$ without causing any change in the midfrequency $(f_0)$. On the other hand adjustment of the network 29 controls the midfrequency adjustment without causing any change in the band width.

The resistance networks 29 and 42 are designed so that the resistance which they respectively present across condensers 30 and 41 are approximately independent of the setting of switches 31, 32, 50 and 51 respectively connecting to taps on the respective resistance networks. Such networks are conventional in the art. The resistance network 43 has a switch 49 comprising two switches 47 and 48 which are mechanically connected as shown. The network 43 is so designed that as the switch 49 is adjusted the total impedance as seen by the condenser 41 remains constant. It is apparent that the current passing between points 39 and 40 of the bridge may be controlled by either the resistance network 42 or the network 43. The switches 50 and 51 of the network 42 are mechanically interconnected with the switches 31 and 32 of the network 29 for a purpose which will be described later. Adjustment of the switch 49 will adjust the filter band width $(f_1-f_2)$ since this current $(\Delta i)$ determines the amount of detuning effected in the two resonant circuits. It is also seen that adjustment of the switch 49 will not alter the current flow between points 26 and 25 of the bridge and therefore will not alter the midfrequency adjustment. On the other hand adjustment of the resistance network 29 will adjust the midfrequency $(f_0)$ but will not alter the band width.

It is apparent that the two D.-C. sources connected to terminals 27 and 44 respectively must be electrically independent of each other, and it is also apparent that the two circuits shown in Figure 2 must be independent of other electrical connections which might destroy the balance of the bridge.

The circuit of Figure 2 may be employed to adjust the frequency and band width of other types of band-pass filter circuits than that shown in Figure 1. In filter circuits employing successive $\pi$ sections having low cut-off and high cut-off characteristics respectively to give a resulting band-pass characteristic, the respective reactors may be connected in appropriate arms of the bridge circuit to provide the adjustments desired. It is apparent that the polarity of the sources connected to terminals 27 and 44 respectively must be such as to effect current changes in the respective control coils in such direction as to change the tuning of the respective sections in the proper direction.

This invention permits of changing the mid-frequency and/or band width of the filter adjustment during the course of a seismograph recording. For the purpose of changing the midfrequency during the recording, a condenser 30 is provided across the network 29 and the latter is provided with two switches 31 and 32. A relay coil 46 operates an armature 28 in such manner that the switch 31 is connected during the early part of the record. This produces a bridge current from points 26 to 25 whose magnitude is determined by the adjustment of switch 31 on the network 29 at the initial moment of the recording. The filters are usually tuned to a relatively high midfrequency during the early part of the record which requires high current from 26 to 25. Relay 46 is arranged so that upon firing the seismic shot the coil 46 is energized and draws the relay armature 28 from switch 31 to switch 32. This results in a lower current flowing from points 26 to 25 of the bridge corresponding to a lower midfrequency adjustment of the filters. The condenser 30 is provided to give a smooth transition from one condition to the other following along the well-known curve of a condenser discharge. The capacity of condenser 30 is such that with the network 29 and the bridge connected to the condenser as shown there will result a time constant of between 2 and 3 seconds.

With the above-described circuit the midfrequency of filter adjustment varies during the course of the recording, starting with a frequency determined by the setting of switch 31 on the network 29, and eventually reaching a frequency determined by the setting of switch 32 on the network 29. As previously indicated, variation of the current through points 26 and 25 alone has no effect on the band width. However, in seismograph prospecting operations it has been found desirable to vary the band width $(f_1-f_2)$ in such manner that the percentage band width or sharpness remains constant. For purposes of this invention sharpness is defined as $f_0/(f_1-f_2)$. In order to maintain sharpness as the midfrequency changes it is desirable to employ a network 42 in the band-width-control circuit having switches 50 and 51 which are respectively mechanically connected to the switches 31 and 32 of the network 29 in the manner shown in Figure 2 by the connections 45 and 46. The switches 50 and 51 are respectively selected by a relay armature 52 connected to the D.-C. source 44. The network 42 is so arranged that movement of the switch 31 to change the midfrequency is accompanied by movement of switch 50 to effect a change in band width such as to keep the percentage band width (sharpness) constant. Similarly adjustment of switch 32 and its connected switch 51 effects a constant percentage band wdith. Therefore as the switches 31 and 32 are adjusted to adjust the initial and final midfrequency of the filter, the respective associated switches 50 and 51 so adjust the band-width-control circuit as to maintain the same percentage band width (sharpness) for the initial and final filter adjustment. The relay 53 with its armature 52 is provided to make the transition from the initial band width to the final band width. For this purpose the relays 46 and 53 may be connected in the same circuit or they may be combined into one double-pole double-throw relay which combines switches 28 and 52 into a common actuating mechanism. The condenser 41 provides a smooth transition from one band width to the other, and its value is such that the time constant of the condenser 41 with the resistance networks 42 and 43 and the bridge connected to it gives a time constant of between 2 and 3 seconds. The capacity of condenser 41 is adjusted to provide the same time constant as that of condenser 30 and for this purpose their capacity controls may be mechanically interconnected if desired. As previously explained, the band width (as contrasted to percentage band width) is independently controlled by the switch 49 of network 43.

It is apparent also that the midfrequency or the band width may be made to vary in either direction, that is either increase or decrease during the course of the recording, by simply reversing the relative positions of switches 31 and 32 or 50 and 51 on their respective resistance networks 29 and 42. However, in seismograph prospecting operations it has been found desirable to decrease the midfrequency during the recording and to maintain the percentage band width fixed during the recording. It is apparent that a varying midfrequency together with constant band width may be obtained by omitting the mechanical connections 45 and 46. It is apparent that by adjusting the capacities of condensers 30 and 41 and the switches 31, 32, 50 and 51 on the networks 29 and 42 any desired combination of frequency change and band-width change may be attained.

It is essential for the intelligent adjustment of the switches 31 and 32 that the operator have a record of the manner in which the frequency varies during the recording. This is provided by the galvanometer 37 as previously described. The operator may, by adjusting switches 31 and 32 which adjust the initial and final frequencies and by adjusting condenser 30 which controls the time constant, cause the instantaneous filter adjustment to fit the observed frequency of a reflection occurring anywhere along the record.

I claim:

1. Means for adjusting the frequency characteristics of an electrical filter having adjustable inductances whose respective values are adjusted by electric-current-responsive control means which comprises a balanced Wheatstone bridge circuit, means connecting the electrical control element of an inductance in one arm of said bridge, means connecting the electrical control element of another inductance in an adjacent arm of said bridge, means connected to one diagonal of said bridge adapted to pass a unidirectional current through said bridge, and means connected to the other diagonal of said bridge adapted to pass a unidirectional current through said bridge.

2. Means for adjusting the frequency characteristics of an electrical filter having an adjustable inductance whose value determines the low-frequency cut-off of the filter and an adjustable inductance whose value determines the high-frequency cut-off of the filter which comprises electric-current-responsive control means respectively adjusting the value of the inductances, a balanced Wheatstone bridge circuit, means connecting the control means of the low-frequency cut-off determining inductance in one arm of said bridge, means connecting the control means of the high-frequency cut-off determining inductance in an adjacent arm of said bridge, means connected to one diagonal of said bridge adapted to pass a unidirectional current through said bridge, and means connected to the other diagonal of said bridge adapted to pass a unidirectional current through said bridge.

3. Means for adjusting the frequency characteristics of an electrical filter having a saturable-core reactor with a control coil whose current controls the low-frequency cut-off of the filter and a saturable-core reactor with a control coil whose current controls the high-frequency cut-off of the filter which comprises a balanced Wheatstone bridge circuit, means connecting the low-frequency cut-off-control coil in one arm of said bridge, means connecting the high-frequency cut-off-control coil in an adjacent arm of said bridge, means connected to one diagonal of said bridge adapted to pass a unidirectional current through said bridge, and means connected to the other diagonal of said bridge adapted to pass a unidirectional current through said bridge.

4. Means for adjusting the frequency characteristics of an electrical filter having a series-tuned inductance and a parallel-tuned inductance which comprises electric-current-responsive control means respectively controlling said inductances, a balanced Wheatstone bridge circuit, means connecting the series-tuned-inductance-control means in one arm of said bridge, means connecting the parallel-tuned-inductance-control means in an adjacent arm of said bridge, means connected to one diagonal of said bridge adapted to pass a unidirectional current through said bridge, and means connected to the other diagonal of said bridge adapted to pass a unidirectional current through said bridge.

5. Means for independently adjusting the mid-frequency and band width of a band-pass filter having a series-tuned inductance and a parallel-tuned inductance which comprises similar electric-current-responsive control means respectively controlling said inductances, a balanced Wheatstone bridge circuit, means connecting the series-tuned-inductance-control means in one arm of said bridge, means connecting the parallel-tuned-inductance-control means in an arm of said bridge which is adjacent to said arm containing said series-tuned-inductance-control means, means connected to one diagonal of said bridge adapted to pass a unidirectional current through said bridge in a direction to vary the current in both of said inductance-control means in the same sense whereby the mid-frequency of the filter is controlled, and means connected to the other diagonal of said bridge adapted to pass a unidirectional current through said bridge in a direction such that when its current is superimposed on said midfrequency-control current it will vary the current in said inductance-control means in opposite senses whereby the bandwidth of the filter is controlled.

6. An electrical filter circuit comprising a first-named section having a saturable-core reactor with a control coil and whose inductance determines the low-frequency cut-off of the filter, a second-named section connected to said first-named section and having a saturable-core reactor with a control coil and whose inductance determines the high-frequency cut-off of the filter, a balanced Wheatstone bridge circuit, means connecting the low-frequency cut-off control coil in one arm of said bridge, means connecting the high-frequency cut-off control coil in an adjacent arm of said bridge, means connected to one diagonal of said bridge adapted to pass a unidirectional current through said bridge, and means connected to the other diagonal of said bridge adapted to pass a unidirectional current through said bridge.

7. An electrical filter circuit comprising a band-pass filter having a controllable series-tuned inductance and a controllable parallel-tuned inductance, electric-current-responsive control means respectively controlling said inductances, a balanced Wheatstone bridge circuit, means connecting the control means of said series-tuned inductance in one arm of said bridge, means connecting the control means of said parallel-tuned inductance in an arm of said bridge which is adjacent to said arm containing said series-tuned-inductance-control means, means connected to one diagonal of said bridge adapted to pass a unidirectional control current through said bridge, and means connected to the other diagonal of said bridge adapted to pass a unidirectional control current through said bridge.

8. Means for adjusting the frequency characteristics of an electrical filter having an inductance whose value determines the low-frequency cut-off of the filter and an inductance whose value determines the high-frequency cut-off of the filter which comprises electric-current-responsive control means respectively controlling the value of the inductances, a balanced Wheatstone bridge circuit, means connecting the control means of the inductance that determines the low-frequency cut-off in one arm of said bridge, means connecting the control means of the inductance that determines the high-frequency cut-off in an adjacent arm of said bridge, means connected to one diagonal of said bridge adapted to pass a first-named unidirectional current through said bridge whereby both said inductances are controlled in the same sense, and means connected to the other diagonal of said bridge adapted to pass a second-named unidirectional current through said bridge, said second-named current being smaller than said first-named current whereby said inductances are controlled in opposite senses.

9. Means for adjusting the frequency characteristics of an electrical filter having an inductance whose value determines the low-frequency cut-off of the filter and an inductance whose value determines the high-frequency cut-off of the filter which comprises electric-current-responsive control means respectively controlling the value of the inductances, a balanced Wheatstone bridge circuit, means connecting the control means of the inductance that determines the low-frequency cut-off in one arm of said bridge, means connecting the control means of the inductance that determines the high-frequency cut-off in an adjacent arm of said bridge, means connected to one diagonal of said bridge adapted to pass a first-named unidirectional current through said bridge whereby both said inductances are controlled in the same sense, a condenser connected to said diagonal of said bridge, and means connected to the other diagonal of said bridge adapted to pass a second-named unidirectional current through said bridge, said second-named current being smaller than said first-named current whereby said inductances are controlled in opposite senses.

10. Means for adjusting the frequency characteristics of an electrical filter having an inductance whose value determines the low-frequency cut-off of the filter and an inductance whose value determines the high-frequency cut-off of the filter which comprises electric-current-responsive control means respectively controlling the value of the inductances, a balanced Wheatstone bridge circuit, means connecting the control means of the inductance that determines the low-frequency cut-off in one arm of said bridge, means connecting the control means of the inductance that determines the high-frequency cut-off in an adjacent arm of said bridge, means connected to one diagonal of said bridge adapted to pass a first-named unidirectional current through said bridge whereby both said inductances are controlled in the same sense, means connected to the other diagonal of said bridge adapted to pass a second-named unidirectional current through said bridge, said second-named current being smaller than said first-named current whereby said inductances are controlled in opposite senses, and a condenser connected to said last-named diagonal of said bridge.

11. Means for adjusting the frequency characteristics of an electrical filter having an inductance whose value determines the low-frequency cut-off of the filter and an inductance whose value determines the high-frequency cut-off of the filter which comprises electric-current-responsive control means respectively controlling the value of the inductances, a balanced Wheatstone bridge circuit, means connecting the control means of the inductance that determines the low-frequency cut-off in one arm of said bridge, means connecting the control means of the inductance that determines the high-frequency cut-off in an adjacent arm of said bridge, means connected to one diagonal of said bridge adapted to pass a first-named unidirectional current through said bridge whereby both said inductances are controlled in the same sense, means connected to the other diagonal of said bridge adapted to pass a second-named unidirectional current through said bridge, said second-named current being smaller than said first-named current whereby said inductances are controlled in opposite senses, and means mechanically interconnecting said two last-named means whereby said opposing-sense control and said same-sense control are simultaneously effected.

12. An electrical filter circuit comprising a first-named section having a saturable-core reactor with a control coil and whose inductance determines the low-frequency cut-off of the filter, a second-named section connected to said first-named section and having a saturable-core reactor with a control coil and whose inductance determines the high-frequency cut-off of the filter, a balanced Wheatstone bridge circuit, means connecting the low-frequency cut-off control coil in one arm of said bridge, means connecting the high-frequency cut-off control coil in an adjacent arm of said bridge, means connected to one diagonal of said bridge adapted to pass a first-named unidirectional current through said bridge whereby the current in both of said cut-off-control coils is controlled in the same sense and whereby the midfrequency of the filter is controlled, and means connected to the other diagonal of said bridge adapted to pass a second-named unidirectional current through said bridge, said second-named current being smaller than said first-named current whereby the current in said cut-off-control coils is controlled in opposite senses and whereby the band width of the filter is controlled.

13. Means for adjusting the frequency characteristic of an electrical filter having electrically-controllable tuning elements which comprises a balanced Wheatstone bridge circuit, means connecting the control element of one tuning element in one arm of said bridge, means connecting the control element of another tuning element in an adjacent arm of said bridge, means connected to one diagonal of said bridge adapted to pass a unidirectional current through said bridge, and means connected to the other diagonal of said bridge adapted to pass a unidirectional current through said bridge.

References Cited in the file of this patent

UNITED STATES PATENTS

| | | |
|---|---|---|
| 2,051,364 | Braden | Aug. 18, 1936 |
| 2,217,806 | Muffly | Oct. 15, 1940 |
| 2,312,642 | Herzenberg | Mar. 2, 1943 |
| 2,330,216 | Hoover et al. | Sept. 28, 1943 |
| 2,413,263 | Suter | Dec. 24, 1946 |
| 2,531,682 | Hornfeck | Nov. 28, 1950 |
| 2,727,139 | Hollandbeck | Dec. 13, 1955 |